Patented Aug. 24, 1954

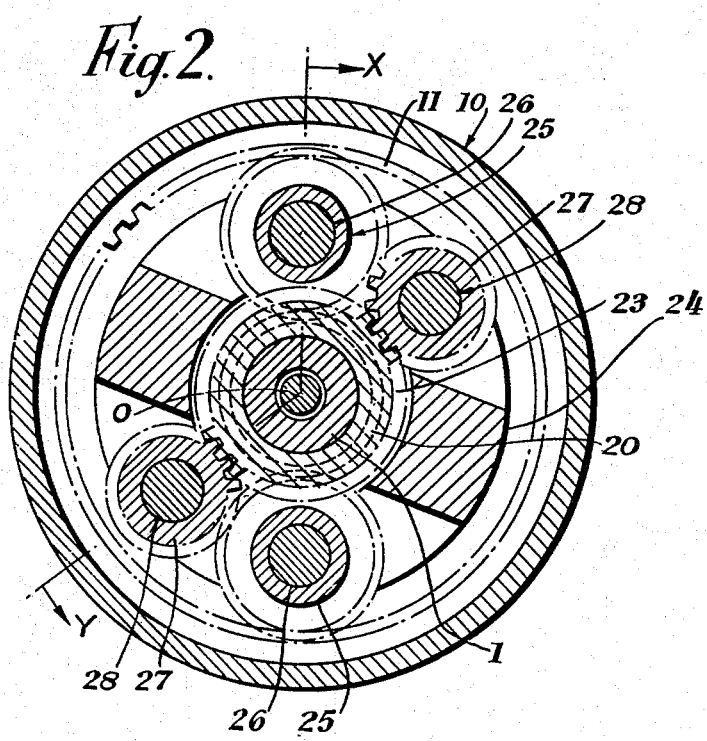

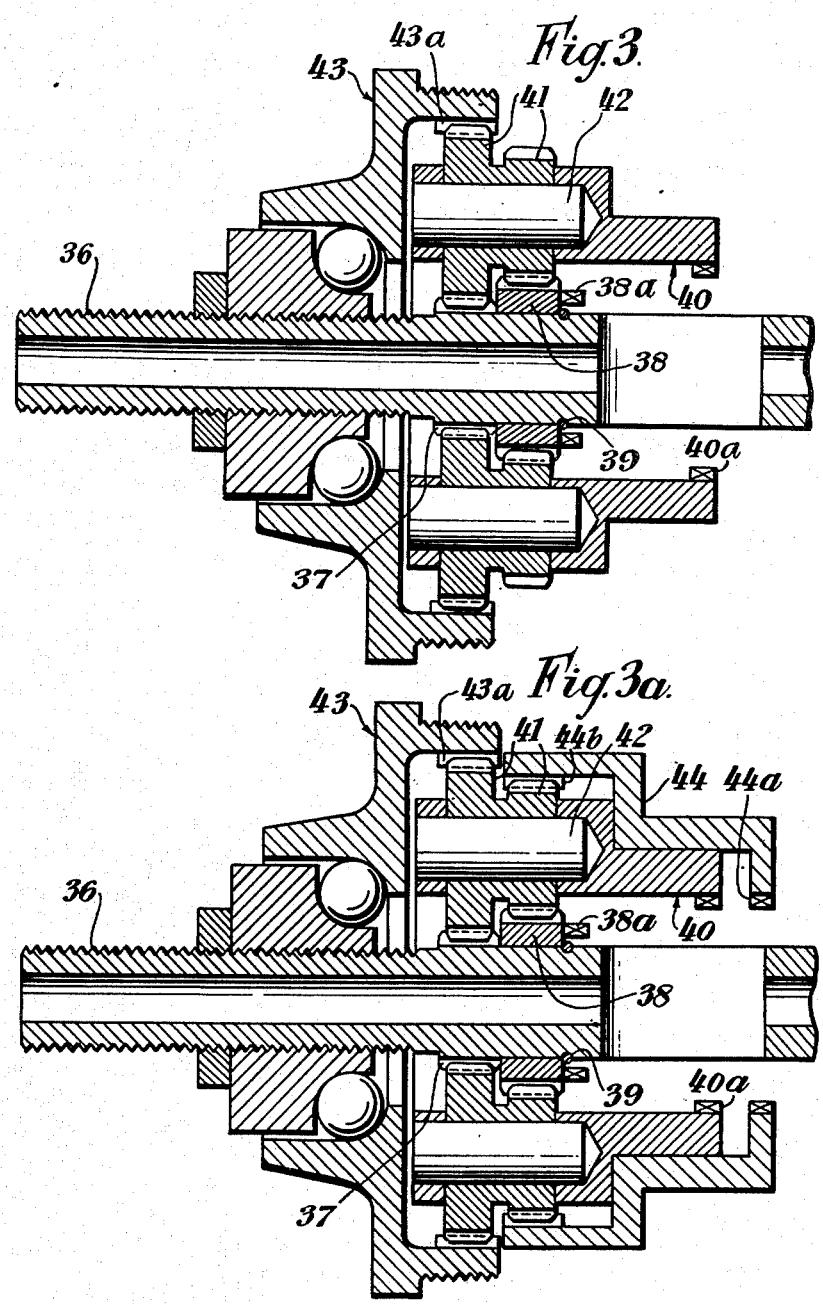

2,687,050

UNITED STATES PATENT OFFICE 2,687,050

EPICYCLIC CHANGE SPEED GEAR

William Brown, Nottingham, England, assignor to Sturmey-Archer Gears Limited

Application May 29, 1952, Serial No. 290,791

Claims priority, application Great Britain June 4, 1951

5 Claims. (Cl. 74—750)

This invention relates to epicyclic change-speed gears, for the driving wheel hub of a bicycle, of the kind having at least two epicyclic gear trains and in which for one speed ratio at least such gear trains are double-coupled, that is to say two of the essential elements of one gear train are constrained to behave in the same manner (i. e. to remain stationary or to move with the same relative speed and direction) as two of the essential elements of the other gear train by reason of mutual coupling, whether permanent or separable. In some forms of double coupling it is possible to omit one of such essential members of each epicyclic gear train. The term permanent mutual coupling is used herein to define either an integral construction, or a two-part construction in which the two parts have separate identity but are not separable during normal use of the gear, while the term separable mutual coupling is used to define a construction in which the two parts have separate identity and are also adapted to be inter-coupled or separated during normal use of the gear, as for example by the movement of selector mechanism when effecting a change of speed ratio.

With such change-speed gears it is convenient to arrange for one of the epicyclic gear trains to receive the input; and such gear train is hereinafter termed the primary gear train, the adjacent epicyclic gear train being termed the "secondary" gear train and the further gear train embodied in the present invention and double-coupled to the secondary gear train being hereinafter termed the tertiary gear train.

The four essential elements of a simple epicyclic gear train are, as is well known, a sun wheel, an annulus co-axial therewith, one or more planet wheels meshing with the sun wheel and annulus and a carrier for the planet wheels known as the planet carrier and co-axial with the sun wheel and annulus. The common axis of the sun wheel, annulus and planet carrier is of course the main axis of the gear train. As already stated, double-coupling, as between adjacent epicyclic gear trains defines coupling between any two of the essential elements of one gear train to any two elements of the other. There is however the limitation that it is only possible to couple a planet wheel of one to a planet wheel of the other, and this automatically results in coupling of the two planet carriers to complete the double-coupling, whereas by appropriate design of the parts any two of the other three elements of one train can be coupled to any two of the other three elements of the other train.

In use, an epicyclic gear train operates in the same manner as a lever, that is to say in order to function there must be coupling to three parts of the gear train respectively, one termed the input member to the driving member, another termed the output member to the driven member and a third, the reaction member to a stationary member, said three parts being comparable with the two ends and the fulcrum respectively of a lever. It is obvious fundamentally that the input and output elements of an epicyclic gear are interchangeable in the sense that the power can be transmitted in either direction with consequent inversion of the gear ratio. In the case of a double-coupled gear train the analogy is less evident because the second epicyclic gear train provides a moving fulcrum for the first gear train, moving as a function of the movement of one of the essential elements of the first gear train but a stationary or true fulcrum of the gear train as a whole must still be provided by holding one of the essential elements of one of the trains stationary. In the case of a bicycle hub gear, it is conventional and convenient to use a sun wheel as the ultimate fulcrum or reaction member. Consequently, with a simple gear train and assuming that the sun wheel forms the reaction member, three gear ratios including direct drive are obtainable, respectively, a reduction ratio by driving the annulus and taking the drive from the planet carrier, direct drive by driving either the annulus or planet carrier and taking the drive from the same element, and an increase ratio by driving the planet carrier and taking the drive from the annulus.

With a simple epicyclic gear train and still assuming that the sun wheel forms the reaction member, as soon as one has elected to couple the annulus or the planet carrier to the driving or driven member, there remains only one free member co-axial with the main axis of the gear for coupling to the driven or driving member, respectively. The addition of further epicyclic gear elements, such as by providing an alternative sun and planet wheels and/or annulus and planet wheels, to obtain other or additional ratios essentially entails double-coupling. If one element of each train is omitted, as is possible when the double-coupling is effected through the planet wheels and planet carrier, the double coupling modifies the ratios but no additional "free member" is provided and therefore no additional ratio is available. Where one or both of the trains has all its four essential elements, there are made available other alternative free members, that is to say members which are freely rotating at different speeds compared with other members which are coupled to the driving and driven members, and further speed ratios are available from the gear as a whole by employing any one of such free elements so that it becomes the driving, driven or reaction member, freeing the element previously in use.

There is still another type of epicyclic gear which consists of an epicyclic gear train in which compound or stepped planet pinions are employed to enable speed ratios to be obtained of a lower order than are obtainable from a simple epicyclic gear train. Such gear is in fact a double-coupled gear within the preceding definition, through coupling of the planet wheels and the use of a common planet carrier though the annulus of one epicyclic gear train and the sun wheel of the other are omitted.

As regards speed ratios normally obtainable by the several arrangements aforesaid, that is to say with the arrangement of proportional dimensions of the parts suitable for a wheel hub gear for a bicycle; ratios of the following order are obtainable:

(1) Simple epicyclic gear: minus 25% and plus 33⅓%.

(2) (a) Double-coupled epicyclic gear train having compounded planet wheels: minus 15 and plus 20%; (b) with an alternative sun wheel, additional ratios of (1) are available.

(3) Double-coupled epicyclic gear trains each with its four essential elements: plus or minus 5% to 10%.

(4) Double-coupled epicyclic gear trains each with its four essential elements and with coupling permitting direct use of primary gear train only: plus or additional ratios of (1), respectively minus 5% to 10% and minus 25%, and plus 33⅓%.

In order to obtain both plus and minus speed ratios aforesaid it is necessary to provide alternative coupling for the output as well as for the input elements of the gear train. Such provision is quite usual and the best known way is to have two pawl-and-ratchet output couplings and a movable selector for the input coupling adapted in one position of movement to trip one of the output pawls, thereby enabling the other pawl, which normally over-runs its ratchet, to become the effective output coupling. In such construction the pawls provide free-wheel coupling in all ratios. An early example of this type of coupling is described in U. S. A. Patent No. 2,301,852.

There are obvious advantages in being able to provide both increase and decrease ratios, not only because more ratios are thereby made available but because the intermediate direct drive may be used as the normal ratio. However it has been appreciated, as can be seen from the earlier patent specification No. 2,441,989 that by dispensing with the normally effective output pawl and substituting direct coupled dogs for the alternative output pawl in a double-coupled gear, a non-free-wheel 3-speed gear is obtainable but with two minus ratios. Hitherto, in order to obtain a non-free-wheel gear with intermediate direct drive, two non-free-wheel output couplings have been required with suitable selector control mechanism. Earlier gears obtaining this effect were known in which the annulus and planet cage of a simple epicyclic gear were bodily slidable to effect engagement of alternative complementary output and input dogs, but such sliding gear arrangement has several known disadvantages.

It is one object of the present invention to provide a fixed, or reversible drive gear in which there is an increase ratio, a direct drive and a reduction ratio (as distinct from a direct drive and two decrease, as described in Patent No. 2,441,989), as well as a more flexible choise of ratios than is possible with hitherto known types of gear, that is, a greater range of selection of gear ratios to suit the requirements of a cyclist. For example, it allows a designer to provide ratios several of which would be substantially the same as would be given by increasing or decreasing the number of teeth of a wheel hub sprocket by one tooth at a time, as in a "derailleur" gear.

Still further objects of the invention are to provide gear ratios even closer than hitherto obtainable (hereinafter called very close ratios) i. e. less than a 5% increase or decrease from the immediately adjacent ratio; to provide a comparatively simple method of achieving gear ratios for a bicycle hub which may provide a possible selection covering a range very close to wide ratios in one hub; to provide as a selective group three, four or more gear ratios of the type required by cyclists in a simpler form than has hitherto been possible, together with some reduction in the weight of the hub, a point which is of great importance to cyclists.

According to the invention an epicyclic change speed gear for the hub of the driving wheel of a bicycle and embodying a double-coupled primary and secondary epicyclic gear trains is characterised in that the secondary epicyclic gear train is itself a double-coupled epicyclic gear train having more than one free member, in combination with means for selectively coupling the sun wheel of the primary gear train to any of the free members aforesaid.

The gear aforesaid may be further characterised in that each of the epicyclic trains of the double-coupled secondary gear is coupled to the primary gear to form the double coupling of the secondary gear train therewith; or further characterised by means for selectively coupling the driving, driven and reaction members to the essential elements of at least one of the gear trains to provide at least one simple ratio from such gear train alone while releasing any other gear train to run free; or further characterised in that the primary gear train is usable by itself; or further characterised in that the direct drive is provided by locking the primary train within itself while uncoupled from a reaction member.

In the drawings:

Fig. 1 shows a longitudinal section on the lines X. O. Y. of Fig. 2 of a hub gear for a bicycle wheel made according to the invention wherein the further or tertiary epicyclic gear train consists of tertiary planet pinions housed in the same planet carrier as and meshing with the planet pinions of the secondary train and a further sun wheel meshing with said tertiary planet pinions but free to rotate on the axle (one gear position is shown above the centre line and an alternative gear position is shown below the centre line). The annulus of the tertiary gear train is omitted.

Fig. 2 shows a cross-section on the line A—A of Fig. 1.

Fig. 3 shows a longitudinal section of the secondary train of another construction of a change-speed hub according to the invention wherein the further or tertiary epicyclic gear train, still having the planet carrier common to that of the secondary gear train consist of planet pinions compounded with those of the secondary train and the addition of a tertiary sun wheel on the axle which meshes with the end of said compound planet pinions remote from the said common annulus of said secondary train.

Fig. 3A is a modification of the construction shown in Fig. 3 showing the addition of a tertiary annulus i. e. one complementary to the tertiary planet pinions.

Fig. 4 shows a further modification of the secondary train so as to provide for uncoupling the secondary sun wheel from the wheel axle to provide further gear ratios.

Figure 1:
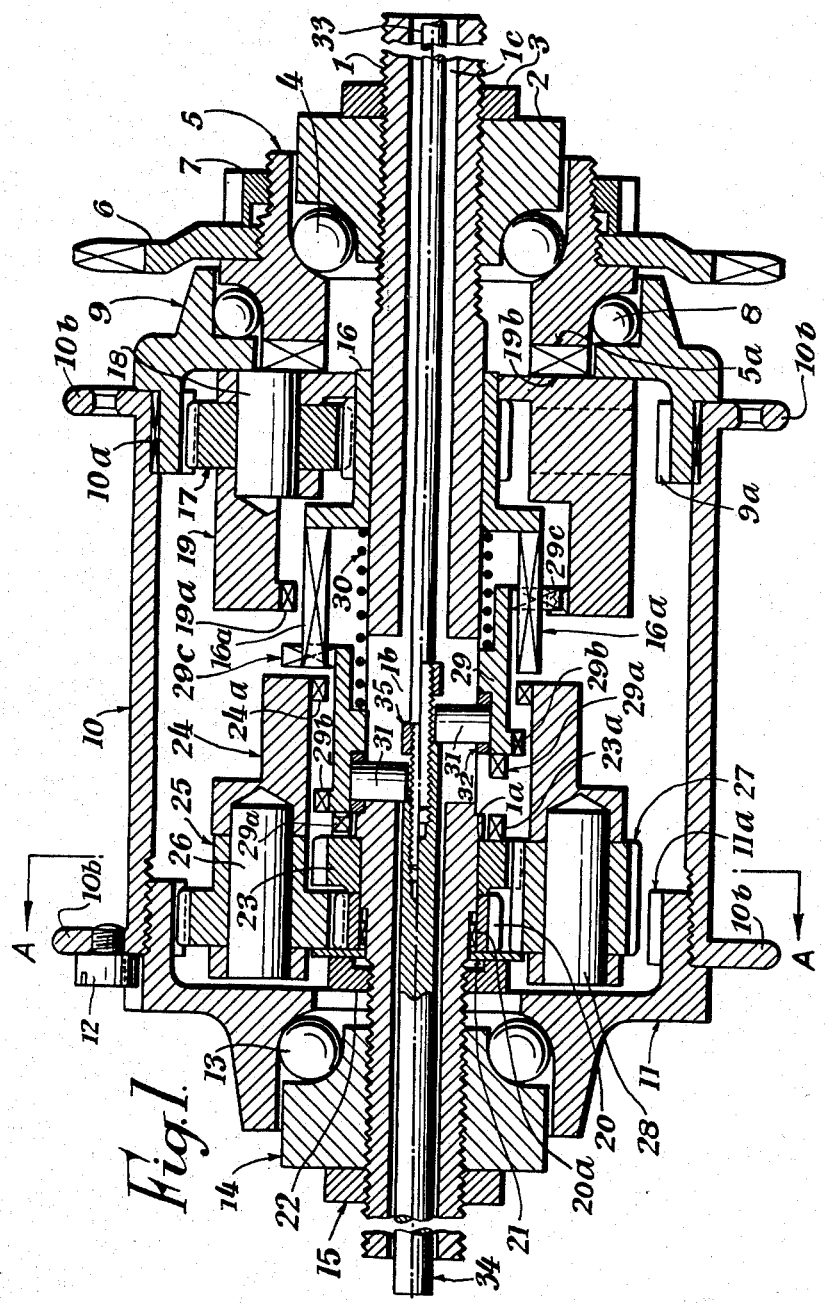

As illustrated in Figs. 1 and 2 the improved gear is shown as a reversible drive (i. e. non freewheel) three-speed hub giving in close ratio, a reduction ratio, a direct drive and an increase ratio. The hub proper comprises a stationary axle 1 on which is mounted a ball-race member 2 secured by a lock nut 3. Running on balls 4 on the member 2 is an input or driving member 5 which is screwed to take a chain sprocket 6 secured by a contra-threaded lock nut 7. Balls 8 running on a ball track formed on the input member 5 carry an end member 9 which is splined or otherwise fixed into the bore of the wheel hub shell 10 at 10a. The wheel hub shell is formed with spoke-receiving flanges 10b. Within the inner bore of the end member 9 are cut gear teeth 9a which form the annulus gear of the primary gear train. In the other end of the wheel hub shell 10 is screwed, or otherwise fixed, an end member 11, secured against unscrewing by suitable means such as the locking screw 12. Within this end member 11 are cut gear teeth 11a which form the annulus gear of the secondary gear train explained in more detail in the succeeding paragraph. The end member 11 runs on balls 13 on the ball race member 14 which is mounted on the axle 1 and secured by a lock nut 15. The primary gear train is a simple epicyclic gear train and is completed by the primary sun pinion 16 which is free to rotate on the axle 1 and which has formed on it extended prongs or dog clutch members 16a, and by planet pinions 17 mounted on pins 18 in the planet carrier 19. Within an extension of the primary planet carrier 19 are dog clutch members 19a. Further dog clutch members 19b on the planet carrier 19 engage with corresponding dog clutch members 5a on the input member 5.

The secondary gear train, having 11a as its annulus, is completed by a sun pinion 20 fixed to the axle 1 by splines 20a and secured by a washer 21 and lock nut 22; a planet carrier 24 provided with an extension within which are dog clutch members 24a and in which planet carrier are mounted planet pinions 25 meshing with the secondary sun pinion 20 and with the annulus teeth 11a of the end member 11. Double-coupled with such epicyclic gear train is the other or tertiary gear train consisting of a sun pinion 23 free to rotate on the axle and provided on its face with dog clutch members 23a and by tertiary planet pinions 27 which mesh with the secondary planet pinions 25 and with the rotatable tertiary sun pinion 23 and which pinions 27 are carried on pins 28. Double-coupling results from the use of the common planet carrier 24 to carry both the planet pinions 23 and 27 and by the intermeshing of such planet pinions. This other or tertiary epicyclic gear train has no separate annulus of its own though one could be provided as suggested later for the arrangement of Fig. 3A. The tertiary sun pinion 23 is located against axial movement in one direction by a shoulder 1a on the axle 1 and in the other direction by the secondary sun pinion 20. The primary gear train is double-coupled to the secondary gear train as follows: Permanently, the annulus 9a of the primary gear train is coupled by the hub shell 10 to the annulus 11a of the secondary gear train. Selectively, the sun wheel 16 of the primary gear train can be coupled, either to the sun pinion 23 of the tertiary gear train, through dogs 29a, 29c as described later, or to the said common planet carrier 24 through dogs 29b, 24a.

Slidably mounted on the axle 1 and free to rotate thereon is a dog clutch selector member 29 on which are formed three sets of dog clutch members 29a, 29b and 29c (seen more clearly in the lower half which is shown displaced to the right relative to the position as shown in the upper half of Fig. 1). The dog clutch member is movable into alternative positions so that (1) teeth 29a engage with the corresponding members 23a on the tertiary sun pinion 23 (see top half of Fig. 1) or (2) the teeth 29b engage with the corresponding members 24a of the common planet carrier 24 or (3) the teeth 29c engage with the corresponding members 19a of the planet carrier 19 (see bottom half of Fig. 1). Further the teeth 29c are permanently in engagement with the prongs 16a of the primary sun pinion 16 but are free to slide axially therein. A spring 30 lying between the sun pinion 16 and the sliding selector member 29 normally urges said clutch member towards the left of Fig. 1 so as to engage teeth 29a with teeth 23a on the sun pinion 23 (as shown in the top half of Fig. 1). A key lying in a slot 1b of the axle 1 engages a sleeve 32 lying within the bore of the sliding selector member 29. An operating rod 33 passes through a hole 1c in the axle 1 and engages with the key 31, a further screwed rod 34 and collar 35 being so arranged that movement of the rod 33 will transmit similar movement to the key 31 and thence via the sleeve 32 to the sliding selector member 29, whereby said member may be located in any one of the alternative positions aforesaid.

In the example shown in Figs. 1 and 2 a reduction gear is given when dogs 29a engage with dogs 23a, a direct one-to-one drive when the dogs 29c are engaged with dogs 19a and an increase gear when dogs 29b are engaged with dogs 24a.

When the dogs 29c and 19a are engaged, for direct drive, the secondary and tertiary gear train runs idle, the primary gear train being locked within itself by locking its sun pinion to its planet carrier through the said dogs and the long dogs 16a. When the secondary gear train is operating the output effort is split, partly through the common annulus 9a of the primary train and partly through the annulus 11a of the secondary and tertiary gear train. The sun wheel 28 always forms the reaction member. When the dogs 29a and 23a are coupled for the reduction speed ratio the primary sun 16 is caused to rotate at the same speed and in the same (contrary to that of the driving member 6) direction as the sun wheel 23 of the tertiary gear train. When the dogs 29b and 24a are engaged, then the primary sun member is caused to rotate at the same speed and in the same direction (the same direction as the driving member) as the common planet carrier 24.

In this example the number of teeth in the various secondary and tertiary gear members are as follows:

| | Teeth |
|---|---|
| Fixed secondary sun pinion 20 | 20 |
| Tertiary sun pinion 23 | 24 |
| Secondary planet pinions 25 | 20 |
| Secondary annulus 11a | 60 |
| Tertiary planet pinions 27 | 16 |

The above numbers of teeth give a ratio of primary sun pinion speed to hub shell speed of .75 to 1 in high gear 1 to 1 in direct gear and 1.375 to 1 in low gear. Also in the example shown in the primary gear train tooth numbers are:

| | Teeth |
|---|---|
| Primary sun pinion 16 | 20 |
| Primary planet pinions 17 | 20 |
| Primary annulus 9a | 60 |

In conjunction with the above primary sun pinion to shell ratios these tooth numbers give overall gear ratios between input member and output member of:

| | |
|---|---|
| Low gear | 1 to .916 |
| Direct drive | 1 to 1 |
| High gear | 1 to 1.0666 |

These ratios are substantially the same as would be obtained by means of alternative wheel hub sprocket teeth, as in a "derailleur" gear, of 15, 16 and 17 teeth respectively. The tooth numbers in each gear train could of course be adjusted to give wider or closer ratios as required. Preferably, the tooth numbers of couplings are such as to provide alternative ratios of sun pinion to shell ratios between minus one and plus two and one-half, i. e. the primary sun may be rotated backwards in relationship to the hub shell at the same speed or forwards at two and one-half times the speed of the hub shell.

If the reversible feature of the drive is not required an external ratchet free-wheel can be substituted for the sprocket, or a pawl-and-ratchet coupling can replace the dog clutch coupling between the input member 5 and the primary planet cage 19.

As illustrated in Fig. 3 an alternative arrangement of secondary and tertiary gear train for a cycle wheel hub gear according to the invention comprises, in place of the axle 1, an axle 36 on which is formed or otherwise fixed the secondary sun pinion 37. Adjacent to this sun pinion is the tertiary sun pinion 38 free to rotate on the axle 36 but prevented from moving axially by suitable means such as a spring ring clip 39. The tertiary sun pinion 38 is provided on one face with dog clutch members 38a. The common planet carrier 40 is similar to the planet carrier 24 in Figs. 1 and 2 but carries double (stepped) planet pinions 41 mounted on pins 42, said pinions meshing with the two sun wheels 37 and 38 and their large diameter meshing with the annulus teeth 43a of the end member 43, replacing the teeth 11a of the end member 11. Within the bore of an extension on the planet carrier 40 are dog clutch members 40a. The dogs 38a and 40a take the place of the dogs 23a and 24a of the example first described (as shown in Fig. 3A), a further annulus member 44 is shown dotted, said further annulus member having annulus teeth 44b meshing with the smaller diameter or tertiary pinion of the double planet pinions 41. An extension of the said annulus member has within its bore dog clutch members 44a which are intended to be engageable by the dogs 29b of the dog clutch member. The secondary and tertiary gear trains of Figs. 3 or 3A can be used in place of the secondary and tertiary gear train shown in Figs. 1 and 2, the dog members 38a, 40a and 44a being selectively engaged by the clutch member 29 as before.

In the example of the invention shown in Figs. 3 and 3A the numbers of teeth in the secondary and tertiary gear train as illustrated are:

| | Teeth |
|---|---|
| Secondary sun pinion 37 | 16 |
| Compound planet pinion 41 | 22 and 16 |
| Annulus 43a | 60 |
| Tertiary sun pinion 38 | 22 |
| Tertiary annulus (Fig. 3A) on 44 | 54 |

The above numbers of teeth give ratios of primary sun pinion speed to hub shell speed as follows:

| | |
|---|---|
| Primary sun 16 coupled to tertiary sun 38 through dogs 38a | .372 to 1 |
| Primary sun 16 coupled to planet carrier 40 through dogs 40a | .789 to 1 |
| Primary sun 16 coupled to tertiary free annulus 44 (Fig. 3A) through dogs 44a | .959 to 1 |
| Primary sun 16 coupled to primary cage 19 through dogs 19a | 1 to 1 |

Using the same primary train as before these ratios give overall gear ratios between input and output speeds of:

| | |
|---|---|
| 3rd increase | 1 to 1.186. |
| 2nd increase | 1 to 1.055. |
| 1st increase | 1 to 1.010 (Fig. 3A). |
| Direct drive | 1 to 1. |

In this example 3rd increase compared with alternative sprockets of a derailleur gear, is equivalent to a difference of three teeth, say from 19 to 16 teeth, 2nd increase is equivalent to one tooth less 19 to 18 and 1st increase gives a gear ratio equivalent to less than one tooth difference, a ratio which is not readily obtainable by other means. The tooth numbers in the various gear members can be adjusted to give other specific gear ratios.

As illustrated in Fig. 4 the two secondary and tertiary sun wheels 20 and 23 of Figs. 1 and 2 are replaced by pinions 45 and 46 both arranged to be free to rotate on the axle 1 and are provided within their respective bores with splines or dog teeth 45c and 46c. The pinion 46 has dogs 46a complementary to the dogs 29a. A further slot 1d is provided in the axle 1 to take a further key 47. The inner end of the control rod 33 is now screwed within the key 31 and a further control rod 48 is screwed within the further key 47. Operation of the control rod 48 selectively locks either sun pinion 45 or 46 to the axle to provide other and different gear ratios from those already described. That is to say, by locking tertiary sun pinion 46 instead of the secondary sun pinion 45 to the axle 1 and accepting the same numbers of teeth in the various members to be as described for Figs. 1 and 2, with 45 and 46 the same as 20 and 23 respectively the available additional primary sun pinion 16 to hub shell 10 ratios are: zero, 1 to 1 and 1.66 to 1. If a free annular member is shown dotted at 44 in Fig. 3A be added so as to mesh with 16 tooth idler pinions as shown at 27 in Fig. 1 it would have 56 teeth and would give a further ratio of 2.38 to 1.

Using the same primary train as enumerated for Figs. 1 and 2 the overall gear ratios between input and output would be as follows:

| | |
|---|---|
| Primary sun 16 to tertiary sun 46 through dogs 46a | 1 to .75 |
| Primary sun 16 to carrier 24 through dogs 24a | 1 to .858 |
| Primary sun 16 to free tertiary annulus 44 through dogs 44a | 1 to .744 |
| Primary sun 16 to primary carrier 19 through dogs 19a | 1 to 1 |

It will be noted that here an alternative method of achieving a reduction of 1–.75 is arrived at; different tooth numbers would obviate this if required.

What I claim is:

1. An epicyclic change-speed gear for the hub of the driving wheel of a bicycle comprising in combination three epicyclic gear trains, respectively a primary, a secondary and a tertiary gear train, the primary and secondary gear trains each having a sun, planet pinion, planet carrier and annulus and the tertiary gear train having at least a planet carrier and planet pinions operatively connected to those of the secondary gear train and one gear member meshing with the planet pinions, means coupling the annulus of the primary gear train to the wheel hub, means coupling an input member to the planet carrier of the primary gear train, selector coupling formations on the planet carrier and on the sun wheel of the primary gear train, said annulus for the secondary gear train having means coupling the said annulus to the wheel hub, the planet carrier for the secondary and tertiary gear trains being common to both, selector coupling formations on said common planet carrier, the planet pinions and sun pinions for the secondary and tertiary gear trains being separate, the planet pinion for the secondary gear train being permanently fixed to the wheel axle, a coupling selector slidably mounted on the wheel axle and means for restraining rotation of the coupling selector, means coupling said selector to the primary sun member and coupling formations on said selector adapted to be engaged alternatively with the tertiary sun member, with the said common planet carrier or with the primary planet carrier.

2. An epicyclic change-speed gear according to claim 1 characterised in that the planet pinions of the tertiary gear train are operatively connected with the planet pinions of the secondary epicyclic gear train by being arranged to mesh therewith.

3. An epicyclic change-speed gear according to claim 1 characterised in that the planet pinions of the tertiary epicyclic gear are in stepped relation to the planet pinions of the secondary epicyclic gear train.

4. An epicyclic change-speed gear according to claim 3 further characterised by a free tertiary annulus having coupling formations complementary to the said coupling selector to provide a further coupling position thereto.

5. An epicyclic change-speed gear according to claim 4 further characterised by means for uncoupling the secondary sun pinion from the axle and for coupling the tertiary pinion to the axle for at least two of the alternative positions of the said coupling selector.

References Cited in the file of this patent

FOREIGN PATENTS

| Number | Country | Date |
|---|---|---|
| 567,340 | Great Britain | Feb. 9, 1945 |